United States Patent
Ohnishi

(10) Patent No.: US 10,259,962 B2
(45) Date of Patent: Apr. 16, 2019

(54) PRINTED MEDIUM MANUFACTURING METHOD, PRINTED MEDIUM MANUFACTURING DEVICE, AND INK

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/665,447

(22) Filed: Aug. 1, 2017

(65) Prior Publication Data

US 2018/0037034 A1 Feb. 8, 2018

(30) Foreign Application Priority Data

Aug. 5, 2016 (JP) .................. 2016-154409

(51) Int. Cl.

| | |
|---|---|
| *C09D 11/037* | (2014.01) |
| *C09D 11/322* | (2014.01) |
| *C09D 11/328* | (2014.01) |
| *D06P 5/30* | (2006.01) |
| *B41J 11/00* | (2006.01) |
| *B41M 5/50* | (2006.01) |
| *C09D 11/50* | (2014.01) |
| *C09D 11/54* | (2014.01) |
| *D06P 5/20* | (2006.01) |
| *D06P 1/44* | (2006.01) |

(52) U.S. Cl.
CPC .......... *C09D 11/328* (2013.01); *B41J 11/002* (2013.01); *B41M 5/50* (2013.01); *C09D 11/037* (2013.01); *C09D 11/322* (2013.01); *C09D 11/50* (2013.01); *C09D 11/54* (2013.01); *D06P 1/44* (2013.01); *D06P 5/2077* (2013.01); *D06P 5/30* (2013.01)

(58) Field of Classification Search
CPC ... C09D 11/037; C09D 11/322; C09D 11/328; D06P 5/30
See application file for complete search history.

(56) References Cited

U.S. PATENT DOCUMENTS

| | | | |
|---|---|---|---|
| 2004/0123773 A1* | 7/2004 | Butler | C09D 11/30 106/31.28 |
| 2009/0191383 A1* | 7/2009 | Kluge | D06P 1/5242 428/195.1 |

(Continued)

FOREIGN PATENT DOCUMENTS

JP 2004291394 10/2004

*Primary Examiner* — Kristal Feggins
*Assistant Examiner* — Kendrick X Liu
(74) *Attorney, Agent, or Firm* — JCIPRNET

(57) ABSTRACT

There is provided a printed medium manufacturing method for manufacturing a printed medium by performing printing with ink with respect to a permeable medium, which is a recording medium that permeates the ink, the method including an ink attaching process of attaching the ink to the permeable medium, a pigment fixing process of fixing a pigment in the ink to the permeable medium with a binder resin in the ink by heating the ink attached to the permeable medium in the ink attaching process, and a dye color developing process of causing the permeable medium itself to develop color with the dye in the ink by heating the ink attached to the permeable medium in the ink attaching process.

7 Claims, 8 Drawing Sheets

(56) References Cited

U.S. PATENT DOCUMENTS

2010/0073408 A1* 3/2010 Hale ................ B41J 2/315
                                                    347/5
2013/0155162 A1* 6/2013 Ohtsuka ............ B41M 5/0047
                                                    347/102
2014/0354744 A1* 12/2014 Ohnishi ............ B41J 2/01
                                                    347/102

* cited by examiner

PRINTED MEDIUM MANUFACTURING METHOD, PRINTED MEDIUM MANUFACTURING DEVICE, AND INK

CROSS REFERENCE TO RELATED APPLICATIONS

This application claims the priority benefit of Japanese Patent Application No. 2016-154409, filed on Aug. 5, 2016. The entirety of the above-mentioned patent application is hereby incorporated by reference herein and made a part of this specification.

TECHNICAL FIELD

The present disclosure relates to a printed medium manufacturing method, a printed medium manufacturing device, and an ink for manufacturing a printed medium by performing printing by ink on a permeable medium, which is a recording medium that permeates ink.

DESCRIPTION OF THE BACKGROUND ART

Dye has low light resistance and weather resistance. Therefore, an ink containing dye, that is, dye ink is not suited for printing on a fabric used outdoors such as clothing including T shirt, labarum, flag, and the like. Furthermore, when the dye ink requires pre-processing for the fabric and post-processing for removing pre-processing agent and non-color developed dye after color development, the required time for printing becomes long and there are a lot of work for printing. In particular, if the pre-process needs to be requested to a professional, the required time for printing becomes longer, and the cost also increases.

A pigment has high light resistance and weather resistance compared to the dye. Therefore, an ink containing the pigment, that is, pigment ink is widely used for printing on a fabric used outdoors. When used for printing on a fabric, the pigment ink does not require the pre-processing on the fabric, and the post-processing merely includes heating and drying, as opposed to the dye ink. Thus, the printing on the fabric by the pigment ink can be easily completed in a short time and at low cost compared to the printing on the fabric by the dye ink.

A method by screen printing and a method by ink jet printing (see e.g., Japanese Unexamined Patent Publication No. 2004-291394) are conventionally known for the method for manufacturing a printed fabric using a pigment ink.

SUMMARY

In the method for manufacturing the printed fabric by ink jet printing using the pigment ink, when carrying out the ink jet printing on a fabric such as cotton having a rough surface and a high permeability using a water base pigment ink, the pigment ink is discharged from an ink jet head and attached to the surface of the fabric serving as a recording medium, and thereafter, a part of the pigment ink permeates into the mesh configuring the fabric, and thus the amount of ink remaining on the surface of the fabric reduces. Thus, compared to when carrying out the ink jet printing on a non-permeable recording medium such as a plastic film using the same pigment ink by the same amount, the print density of the surface of the recording medium lowers and hence the quality of printing is not sufficient. In the method for manufacturing the printed fabric by ink jet printing using the pigment ink, the print density of the surface of the fabric can be enhanced by increasing the amount of pigment ink to use for printing, but if the amount of pigment ink to use is increased, smearing of the pigment ink at the fabric becomes large, and again, the quality of printing does not become sufficient.

In the method for manufacturing the printed fabric by ink jet printing using the pigment ink, when carrying out the ink jet printing using the pigment ink on a fabric such as carpet or a towel in which a great number of tall fluffs are raised on the surface, the pigment is discharged from the ink jet head and caught at the fluff on the surface of the fabric, and hence the entire surface of the fabric cannot be dyed. The quality of printing is thus not sufficient.

Furthermore, in the method for manufacturing the printed fabric by ink jet printing using the pigment ink, a pigment ink 911a is discharged from an ink jet head (not shown) and attached to a surface 990a of a fabric 990, but does not permeate into a fiber 991 configuring the fabric 990, as shown in FIGS. 7A and 7B. Thus, when a strong friction is applied on the fabric 990 performed with the ink jet printing using the pigment ink 911a, the fiber 991 of the fabric 990 may rotate or move, and a portion 990b not attached with the pigment in the fabric 990 may appear on the surface 990a of the fabric 990, as shown in FIGS. 7C and 7D, and thus the print density of the surface 990a of the fabric 990 lowers. A tendency the portion 990b not attached with the pigment in the fabric 990 appears on the surface 990a of the fabric 990 by the strong friction is significant particularly when the fabric is moist and soft. In other words, the method for manufacturing the printed fabric by ink jet printing using the pigment ink has low fastness to rubbing, in particular, the fastness to rubbing at the time of moistness and fastness to laundering.

As the pigment cannot dye the fiber itself in the fabric, in the method for manufacturing the printed fabric by ink jet printing using the pigment ink, when the pigment ink 911a is discharged from an ink jet head (not shown) and attached to the surface 990a of the fabric 990, the pigment is in a state of being adhered to the fiber 991 of the fabric 990 with a binder resin, as shown in FIGS. 8A and 8B. Thus, when a strong friction is applied on the fabric 990 performed with the ink jet printing using the pigment ink 911a, the pigment may fall off from a part of the fiber 991 of the fabric 990, and a portion 990c not attached with the pigment in the fabric 990 may appear on the surface 990a of the fabric 990, as shown in FIGS. 8C and 8D, and thus the print density of the surface 990a of the fabric 990 lowers. A tendency the portion 990c not attached with the pigment in the fabric 990 appears on the surface 990a of the fabric 990 by the strong friction is significant particularly when the fabric is moist and soft. In other words, the method for manufacturing the printed fabric by ink jet printing using the pigment ink has low fastness to rubbing, in particular, the fastness to rubbing at the time of moistness and fastness to laundering.

As described above, the method for manufacturing the printed fabric by ink jet printing using the pigment ink has a problem in that the quality of printing with respect to the fabric is not sufficient and a problem in that the fastness after the printing is low.

The present disclosure thus provides a printed medium manufacturing method, a printed medium manufacturing device, and an ink capable of enhancing the quality of printing and the fastness with respect to a permeable medium compared to the conventional art.

A printed medium manufacturing method of the present disclosure relates to a printed medium manufacturing method for manufacturing a printed medium by performing printing with ink with respect to a permeable medium, which is a recording medium that permeates ink, where the ink includes a pigment for dying the permeable medium, a binder resin that fixes the pigment to the permeable medium by being heated, and a dye that causes the permeable medium itself to develop color by being heated; and the printed medium manufacturing method includes an ink attaching process of attaching the ink to the permeable medium, a pigment fixing process of fixing the pigment to the permeable medium with the binder resin by heating the ink attached to the permeable medium in the ink attaching process, and a dye color developing process of causing the permeable medium itself to develop color with the dye by heating the ink attached to the permeable medium in the ink attaching process.

According to such configuration, the printed medium manufacturing method of the present disclosure can suppress the usage amount of the ink necessary for achieving a sufficient print density since not only is the permeable medium dyed with the pigment in the ink but the permeable medium itself is caused to develop color with the dye in the ink. Therefore, the printed medium manufacturing method of the present disclosure can enhance the print density of the surface of the permeable medium while suppressing the smearing of the ink at the surface of the permeable medium. In other words, the printed medium manufacturing method of the present disclosure can enhance the quality of printing compared to the conventional art. Furthermore, in the printed medium manufacturing method of the present disclosure, even if the portion not attached with the pigment in the permeable medium appears on the surface of the permeable medium when a strong friction is applied on the printed medium, and the like, the lowering of the print density of the surface of the permeable medium can be suppressed as the permeable medium itself is caused to develop color with the dye in the ink. Therefore, the printed medium manufacturing method of the present disclosure can enhance the fastness compared to the conventional art.

In the printed medium manufacturing method of the present disclosure, the ink may include a solvent; the printed medium manufacturing method may further include a viscosity increasing process of evaporating the solvent to increase the viscosity of the ink before the dye color developing process; and a heating temperature of the ink may be high in the dye color developing process compared to the viscosity increasing process.

According to such configuration, the printed medium manufacturing method of the present disclosure increases the viscosity of the ink by the viscosity increasing process before the dye color developing process to suppress the smearing of the ink at the surface of the permeable medium, and hence can enhance the quality of printing.

In the printed medium manufacturing method of the present disclosure, the binder resin may be a latex system resin.

According to such configuration, in the printed medium manufacturing method of the present disclosure, the binder resin in the ink is the latex system resin, and the fine particles of the binder resin are dispersed in the solvent of the ink, and thus the amount of increase in the viscosity of the ink with respect to the amount of evaporation of the solvent of the ink becomes large, and the viscosity of the ink can be increased at high speed. Therefore, the printed medium manufacturing method of the present disclosure can enhance the quality of printing while suppressing the smearing of the ink at the surface of the permeable medium.

In the printed medium manufacturing method of the present disclosure, the binder resin may be a disperse dye.

According to such configuration, in the printed medium manufacturing method of the present disclosure, the auxiliary agent is not necessary in the ink, and thus the process for the auxiliary agent is also not necessary. Therefore, the printed medium manufacturing method of the present disclosure can easily manufacture the printed medium.

In the printed medium manufacturing method of the present disclosure, a color of the pigment and a color after color development of the dye may not be colors similar to a color of the permeable medium in a non-dyed state.

According to such configuration, in the printed medium manufacturing method of the present disclosure, even if the portion not attached with the pigment in the permeable medium appears on the surface of the permeable medium when a strong friction is applied on the printed medium, and the like, the portion not attached with the pigment in the permeable medium is less likely to be visually recognized as the permeable medium itself is caused to develop color with the dye of a color not similar to the color of the permeable medium in the non-dyed state. Therefore, the printed medium manufacturing method of the present disclosure can enhance the fastness.

In the printed medium manufacturing method of the present disclosure, a color of the pigment and a color after color development of the dye may be similar colors to each other.

According to such configuration, in the printed medium manufacturing method of the present disclosure, even if the portion not attached with the pigment in the permeable medium appears on the surface of the permeable medium when a strong friction is applied on the printed medium, and the like, the portion not attached with the pigment in the permeable medium is less likely to be visually recognized as the permeable medium itself is caused to develop color with the dye in the ink to a color similar to the color of the pigment in the ink. Therefore, the printed medium manufacturing method of the present disclosure can enhance the fastness.

In the printed medium manufacturing method of the present disclosure, the ink attaching process may be a process of attaching the ink to the permeable medium by the ink jet printing; and the viscosity of the ink may be a viscosity at which the ink jet printing can be carried out.

According to such configuration, the printed medium manufacturing method of the present disclosure can suppress the usage amount of the ink necessary for achieving a sufficient print density even with the ink having a viscosity the ink jet printing can be carried out, that is, the ink of low viscosity since not only is the permeable medium dyed with the pigment in the ink but the permeable medium itself is caused to develop color with the dye in the ink. Therefore, the printed medium manufacturing method of the present disclosure can enhance the print density of the surface of the permeable medium while suppressing the smearing of the ink at the surface of the permeable medium. In other words, the printed medium manufacturing method of the present disclosure can enhance the quality of printing.

A printed medium manufacturing device of the present disclosure relates to a printed medium manufacturing device for manufacturing a printed medium by performing printing with ink with respect to a permeable medium, which is a recording medium that permeates ink, where the ink includes a pigment for dying the permeable medium, a binder resin that fixes the pigment to the permeable medium by being heated, and a dye that causes the permeable medium itself to develop color by being heated; and the printed medium manufacturing device includes an ink attaching device for attaching the ink to the permeable medium, a pigment fixing device for fixing the pigment to the permeable medium with the binder resin by heating the ink attached to the permeable medium by the ink attaching device, and a dye color developing device for causing the permeable medium itself to develop color with the dye by heating the ink attached to the permeable medium by the ink attaching device.

According to such configuration, the printed medium manufacturing device of the present disclosure can suppress the usage amount of the ink necessary for achieving a sufficient print density since not only is the permeable medium dyed with the pigment in the ink but the permeable medium itself is caused to develop color with the dye in the ink. Therefore, the printed medium manufacturing device of the present disclosure can enhance the print density of the surface of the permeable medium while suppressing the smearing of the ink at the surface of the permeable medium. In other words, the printed medium manufacturing device of the present disclosure can enhance the quality of printing compared to the conventional art. Furthermore, in the printed medium manufacturing device of the present disclosure, even if the portion not attached with the pigment in the permeable medium appears on the surface of the permeable medium when a strong friction is applied on the printed medium, and the like, the lowering of the print density of the surface of the permeable medium can be suppressed as the permeable medium itself is caused to develop color with the dye in the ink. Therefore, the printed medium manufacturing device of the present disclosure can enhance the fastness compared to the conventional art.

An ink of the present disclosure relates to an ink used in a printed medium manufacturing method for manufacturing a printed medium by performing printing with the ink with respect to a permeable medium, which is a recording medium that permeates the ink, the ink including a pigment for dying the permeable medium, a binder resin that fixes the pigment to the permeable medium by being heated, and a dye that causes the permeable medium itself to develop color by being heated.

According to such configuration, the ink of the present disclosure can suppress the usage amount of the ink necessary for achieving a sufficient print density since not only is the permeable medium dyed with the pigment but the permeable medium itself is caused to develop color with the dye. Therefore, the ink of the present disclosure can enhance the print density of the surface of the permeable medium while suppressing the smearing at the surface of the permeable medium. In other words, the ink of the present disclosure can enhance the quality of printing compared to the conventional art. Furthermore, in the ink of the present disclosure, even if the portion not attached with the pigment in the permeable medium appears on the surface of the permeable medium when a strong friction is applied on the printed medium, and the like, the lowering of the print density of the surface of the permeable medium can be suppressed as the permeable medium itself is caused to develop color with the dye. Therefore, the ink of the present disclosure can enhance the fastness compared to the conventional art.

A printed medium manufacturing method, a printed medium manufacturing device, and an ink of the present disclosure can enhance the quality and the fastness of printing with respect to a permeable medium compared to the conventional art.

DETAILED DESCRIPTION OF EMBODIMENTS

Hereinafter, one embodiment of the present disclosure will be described using the drawings.

First, a configuration of an ink jet printer serving as a printed medium manufacturing device according to the present embodiment will be described.

Figure 1:
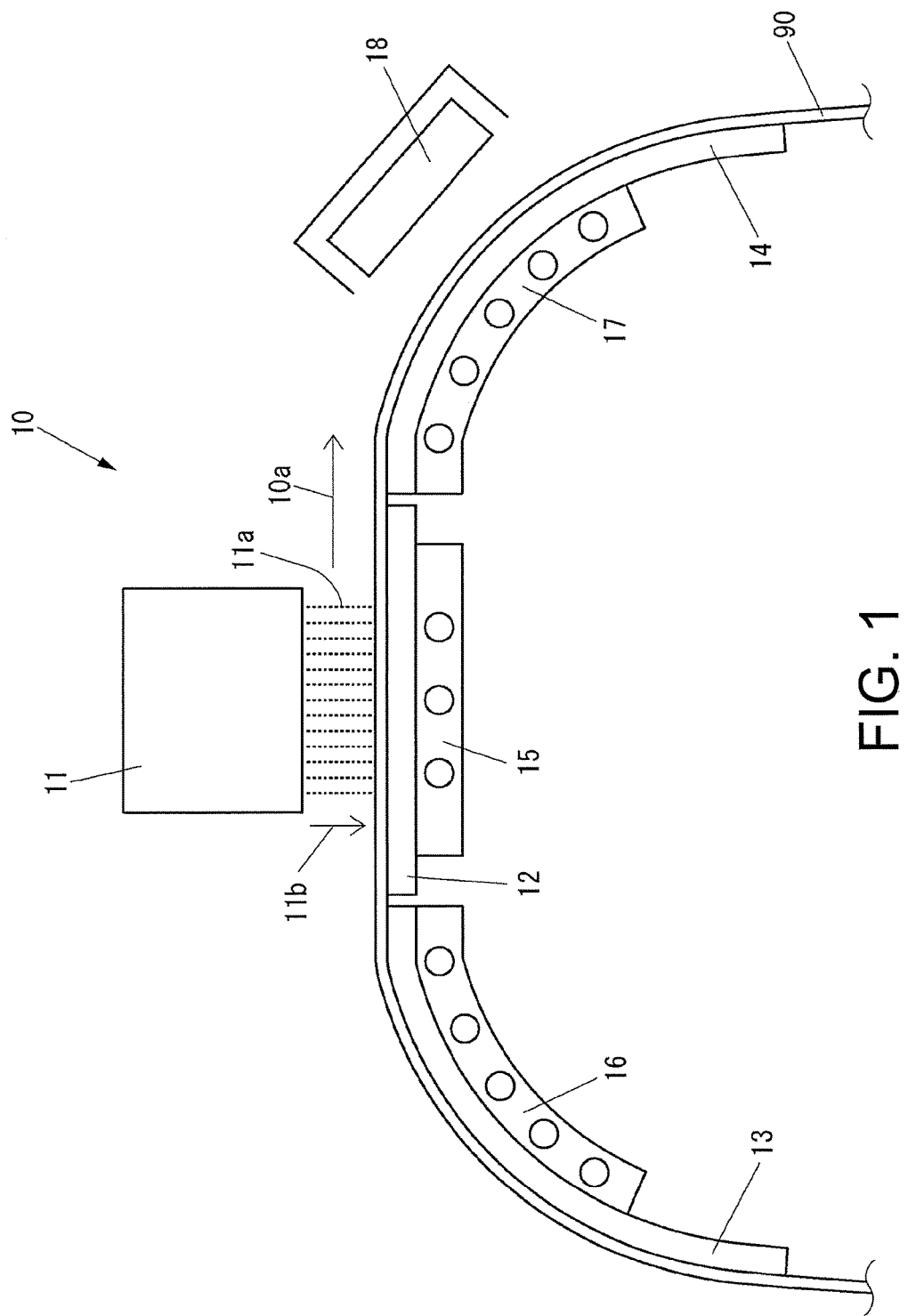
FIG. 1 is a schematic side view of an ink jet printer according to one embodiment of the present disclosure.

FIG. 1 is a schematic side view of an ink jet printer 10 according to the present embodiment.

As shown in FIG. 1, the ink jet printer 10 includes an ink jet head 11 that discharges an ink 11a toward a permeable medium 90, which is a recording medium that permeates the ink 11a, a print platen 12 that is arranged on a discharging direction (direction indicated with an arrow 11b) side of the ink 11a by the ink jet head 11 with respect to the ink jet head 11 and that supports the permeable medium 90, a pre-platen 13 that is arranged on a direction opposite to a transporting direction (direction indicated with an arrow 10a) side of the permeable medium 90 with respect to the print platen 12 and that supports the permeable medium 90, and an after platen 14 that is arranged on the transporting direction (direction indicated with the arrow 10a) side of the permeable medium 90 with respect to the print platen 12 and that supports the permeable medium 90.

The permeable medium 90 is, for example, a fabric. The permeable medium 90 may be, for example, a fabric (woven fabric) woven with a fibrous thread, or may be a knitted fabric knitted with a fibrous yarn. The material of the permeable medium 90 is, for example, polyester.

The ink jet printer 10 includes four ink jet heads 11 capable of discharging the ink 11a of, for example, yellow, magenta, cyan, and black, respectively. The ink jet head 11 is a device that attaches the ink 11a to the permeable medium 90, and configures an ink attaching device of the present disclosure.

The ink 11a contains, for example, a solvent such as water, a pigment for dying the permeable medium 90, a binder resin of aqueous latex system that fixes the pigment to the permeable medium 90 by being heated, and a dye that causes the permeable medium 90 itself to develop color by being heated.

The color after the color development of the dye in the ink 11a is preferably a color same as or a color close to the color of the pigment in the same ink 11a. For example, the color after the color development of the dye in the ink 11a is preferably a similar color to the color of the pigment in the same ink 11a. Furthermore, the color after the color development of the dye in the ink 11a preferably has, for example, ΔE in a range within 30 in a color difference formula based on a CIE 1976 color space with respect to the color of the pigment in the same ink 11a. When the color after the color development of the dye in the ink 11a is a color same as or a color close to the color of the pigment in the same ink 11a, a color difference can be eliminated or reduced between a portion dyed with the dye and a portion dyed with the pigment in the permeable medium 90 printed by the ink 11a, so that the turbidity of the color of the image printed by the ink 11a on the permeable medium 90 can be eliminated or reduced. The type and concentration of the dye in the ink 11a are preferably selected to satisfy such color conditions.

The dye in the ink 11a merely needs to causes the permeable medium 90 itself to develop color by being heated, and is for example, a reactive dye, an acid dye, a disperse dye, or a sublimation dye.

Furthermore, the ink 11a may contain an auxiliary agent for effectively causing the dye to develop color, and a dye mordant that fixes the dye to the fiber of the permeable medium 90, as necessary. For example, the ink 11a may contain a salt cake (sodium sulfate) when the dye is the reactive dye.

Moreover, the ink 11a may contain a viscosity modifier, an antiseptic agent, and the like.

The viscosity of the ink 11a is preferably, for example, about 2 to 100 mPa·sec at which the ink can be appropriately discharged with the ink jet head 11. The surface tension of the ink 11a is also preferably, for example, about 23 to 40 mN/m at which the ink can be appropriately discharged with the ink jet head 11. The viscosity and the surface tension of the ink 11a can be adjusted with the solvent, the resin, a thickening agent, and the like added to the ink 11a.

The ink jet head 11 is preferably a piezo type, but may be other types. For example, the ink jet head 11 may be a thermal jet type.

The ink jet printer 10 includes a print heater 15, which is an electrothermal heater, arranged on a side opposite the side the print platen 12 supports the permeable medium 90 with respect to the print platen 12, for heating the ink 11a of a portion supported by the print platen 12 in the permeable medium 90, a pre-heater 16, which is an electrothermal heater, arranged on a side opposite the side the pre-platen 13 supports the permeable medium 90 with respect to the pre-platen 13, for heating the ink 11a of a portion supported by the pre-platen 13 in the permeable medium 90, an after-heater 17, which is an electrothermal heater, arranged on a side opposite the side the after platen 14 supports the permeable medium 90 with respect to the after platen 14, for heating the ink 11a of a portion supported by the after platen 14 in the permeable medium 90, and an infrared after-heater 18, which is an infrared heater, arranged at a position of sandwiching the permeable medium 90 supported by the after platen 14 with the after platen 14, for heating the ink 11a of a portion supported by the after platen 14 in the permeable medium 90.

The infrared after-heater 18 is a device that heats the ink 11a on the permeable medium 90 by irradiating light such as infrared light, near infrared light.

The after-heater 17 and the infrared after-heater 18 are devices that fix the pigment in the ink 11a to the permeable medium 90 with the binder resin in the ink 11a by heating the ink 11a attached to the permeable medium 90 by the ink jet head 11, and configure a pigment fixing device of the present disclosure, as will be described later. Furthermore, the after-heater 17 and the infrared after-heater 18 are devices that cause the permeable medium 90 itself to develop color with the dye in the ink 11a by heating the ink 11a attached to the permeable medium 90 by the ink jet head 11, and configure a dye color developing device of the present disclosure, as will be described later.

Figure 2:
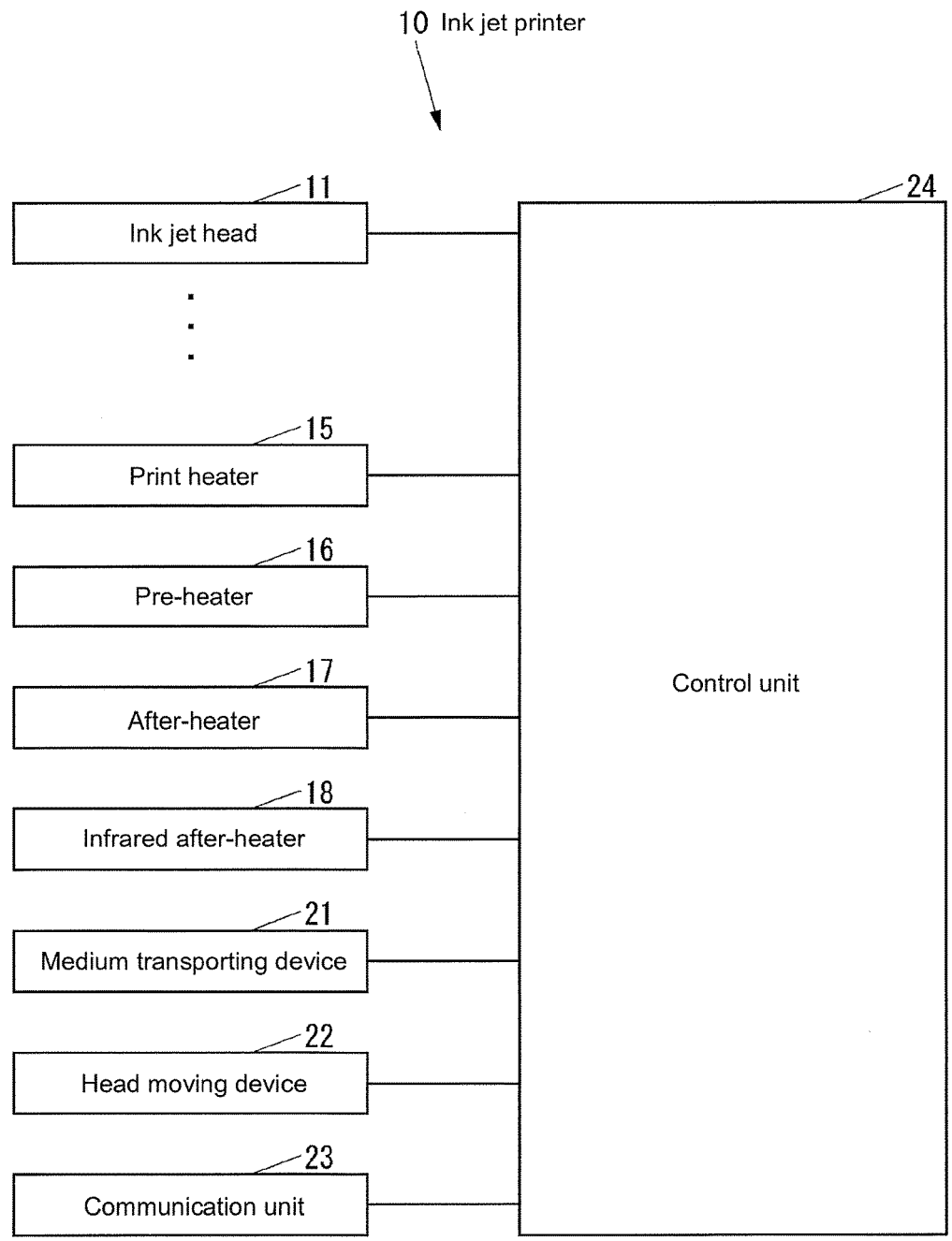
FIG. 2 is a block diagram of the ink jet printer shown in FIG. 1.

FIG. 2 is a block diagram of the ink jet printer 10.

As shown in FIG. 2, the ink jet printer 10 includes a medium transporting device 21 that transports the permeable medium 90 (see FIG. 1) in a direction indicated with the arrow 10a (see FIG. 1), that is a sub-scanning direction with respect to the ink jet head 11, a head moving device 22 that moves the ink jet head 11 in a direction orthogonal to both the direction indicated with the arrow 10a and a direction indicated with the arrow 11b (see FIG. 1), that is, a main scanning direction, a communication unit 23, which is a communication device, that carries out communication with an external device directly in a wired or wireless manner without through the network such as the LAN (Local Area Network) or through the network, and a control unit 24 that controls the entire ink jet printer 10.

The control unit 24 includes, for example, a CPU (Central Processing Unit), a ROM (Read Only Memory) that stores programs and various types of data in advance, and an RAM (Random Access Memory) used as a work region of the CPU. The CPU executes the program stored in the ROM.

Next, a printed medium manufacturing method according to the present embodiment will be described.

The printed medium manufacturing method according to the present embodiment is a method for manufacturing a printed medium, that is, the printed permeable medium 90 by carrying out printing by the ink 11a on the permeable medium 90. Specifically, the printed medium manufacturing method according to the present embodiment includes an ink jet printing step of attaching the ink 11a to the permeable medium 90, and a fixing and color developing step of fixing the pigment in the ink 11a to the permeable medium 90 and causing the fiber itself of the permeable medium 90 to develop color with the dye in the ink 11a after the ink jet printing step.

First, the ink jet printing step will be described.

The control unit 24 drives the ink jet head 11, the medium transporting device 21, and the head moving device 22 based on the print data input through the communication unit 23. Specifically, the control unit 24 discharges the ink 11a toward the permeable medium 90 with the ink jet head 11 while moving the ink jet head 11 in the main scanning direction with the head moving device 22 every time the position of the permeable medium 90 in the sub-scanning direction with respect to the ink jet head 11 is changed by the medium transporting device 21 to form an image based on the print data on the permeable medium 90 with the ink 11a. In other words, the control unit 24 executes an ink attaching process of attaching the ink 11a with respect to the permeable medium 90.

Furthermore, the control unit 24 heats the print heater 15 when forming the image based on the print data with respect to the permeable medium 90 with the ink 11a. Therefore, the ink 11a is heated to, for example, 30° C. to 60° C. by the print heater 15 at the instant the ink is attached to the permeable medium 90. This heating suppresses the smearing of the ink 11a with respect to the permeable medium 90 as the solvent is evaporated and hence the viscosity is increased. In other words, the control unit 24 executes a viscosity increasing process of increasing the viscosity of the ink 11a by evaporating the solvent of the ink 11a.

To be appropriately heated by the print heater 15 at the instant the ink 11a is attached to the permeable medium 90, the permeable medium 90 may be heated in advance by the pre-heater 16. In this case, the control unit 24 heats the pre-heater 16 when forming the image based on the print data with respect to the permeable medium 90 with the ink 11a.

Figure 3A:
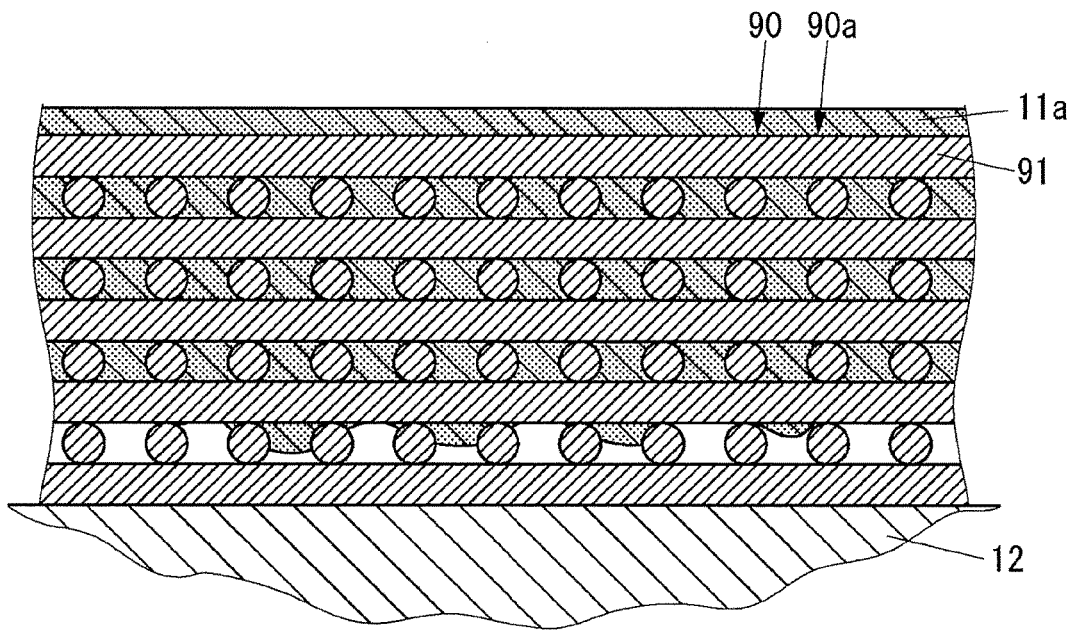
FIG. 3A is a side cross-sectional view of one part of the permeable medium on which the ink is applied in an ink jet printing step by the ink jet printer shown in FIG. 1.
Figure 3B:
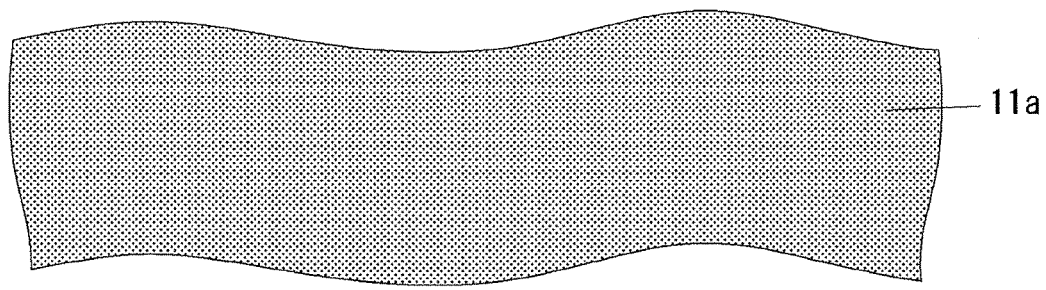
FIG. 3B is a top view of one part of the permeable medium shown in FIG. 3A.

FIG. 3A is a side cross-sectional view of one part of the permeable medium 90, on which the ink 11a is applied in the ink jet printing step by the ink jet printer 10. FIG. 3B is a top view of one part of the permeable medium 90 shown in FIG. 3A.

As shown in FIGS. 3A and 3B, the ink 11a permeates to not only a portion on the surface on the ink jet head 11 side, that is, the surface 90a side of the permeable medium 90, but also into the inside of the permeable medium 90, that is, the mesh configured by the fiber 91 configuring the permeable medium 90.

Next, the fixing and color developing step will be described.

The control unit 24 heats the after-heater 17, irradiates the infrared ray with the infrared after-heater 18, and drives the medium transporting device 21. In other words, the control unit 24 transports the permeable medium 90 to the positions of the after-heater 17 and the infrared after-heater 18 with the medium transporting device 21, and heats the permeable medium 90 with the after-heater 17 and the infrared after-heater 18. Therefore, the ink 11a is heated to, for example 60° C. to 200° C., and preferably 120° C. to 180° C. with the after-heater 17 and the infrared after-heater 18. This heating fixes the pigment in the ink 11a to the permeable medium 90 by adhering it to the fiber 91 of the permeable medium 90 with the binder resin. Furthermore, the heating causes the dye in the ink 11a to diffuse through the fiber 91, and the fiber 91 itself to develop color with the dye. In other words, the control unit 24 heats the ink 11a attached to the permeable medium 90 in the ink attaching process to execute a pigment fixing process of fixing the pigment in the ink 11a to the permeable medium 90 with the binder resin in the ink 11a, and a dye color developing process of causing the permeable medium 90 itself to develop color with the dye in the ink 11a.

When a combination of the dye in the ink 11a and the fiber 91 of the permeable medium 90 is a combination that requires a steaming process, the printed medium manufacturing method according to the present embodiment executes a steaming process by placing the permeable medium 90 in a steam oven, or the like after the fixing and color developing process. For example, when the dye in the ink 11a is a reactive dye or an acid dye, the steaming process is sometimes necessary. When executing the steaming process, the printed medium manufacturing method according to the present embodiment can effectively dye the permeable medium 90 with the dye in the ink 11a as the fiber 91 is steamed and spread, and the dye in the ink 11a easily enters the fiber 91.

When the dye in the ink 11a is a reactive dye or an acid dye, the auxiliary agent for the dye to develop color is sometimes necessary. In the printed medium manufacturing method according to the present embodiment, when the auxiliary agent for the dye to develop color is necessary, it is the easiest and the most preferable to add the auxiliary agent to the ink 11a. However, if drawbacks arise in the ink 11a such as the pigment in the ink 11a clumps together, the dye in the ink 11a changes property, and the like when the auxiliary agent is added to the ink 11a, the auxiliary agent is preferably applied to the permeable medium 90 separate from the ink 11a in the printed medium manufacturing method according to the embodiment. For example, an ink containing the auxiliary agent (hereinafter referred to as "auxiliary agent ink") may be prepared separate from the ink 11a, and the auxiliary agent ink may be printed on the permeable medium 90 with an ink jet head different from the ink jet head 11 before the printing, during the printing, or after the printing on the permeable medium 90 by the ink jet head 11. Furthermore, the auxiliary agent may be applied to the permeable medium 90 through a method other than the ink jet printing before the printing or after the printing on the permeable medium 90 by the ink jet head 11. If the auxiliary agent is not to be remained on the permeable medium 90 for some reason such as because the permeable medium 90 is going to be used for clothing, and the like, the printed medium manufacturing method according to the present embodiment may include a step of washing the permeable medium 90 to remove the auxiliary agent as the post-process.

Figure 4:
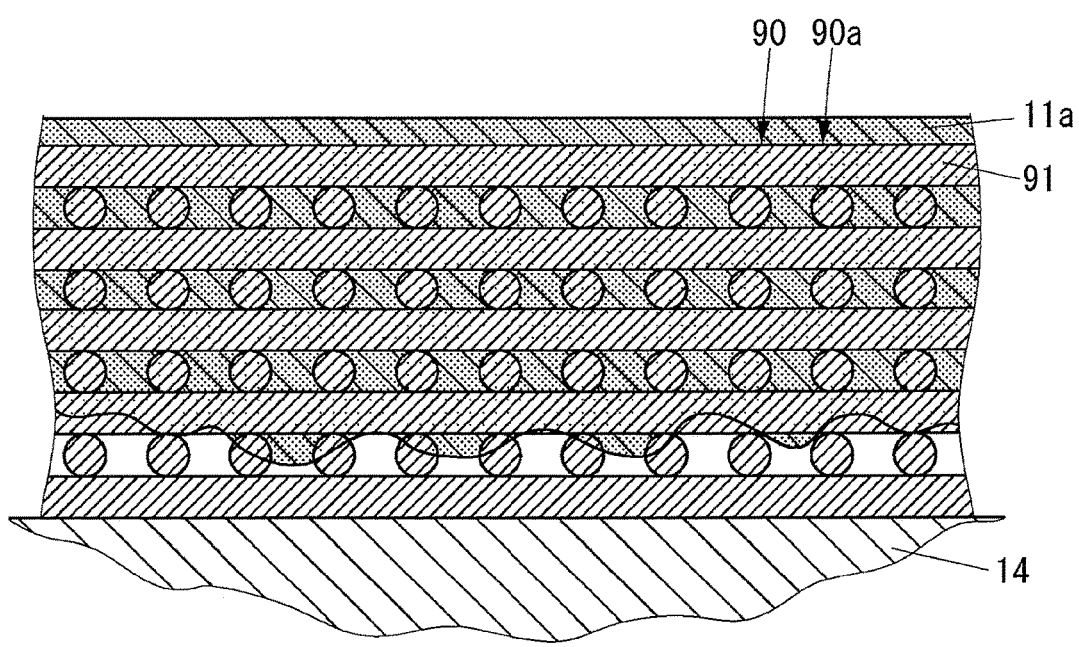
FIG. 4 is a side cross-sectional view of one part of the permeable medium in which the dye in the ink is caused to develop color in a fixing and color developing step by the ink jet printer shown in FIG. 1.

FIG. 4 is a side cross-sectional view of one part of the permeable medium 90 in which the dye in the ink 11a is caused to develop color in the fixing and color developing step by the ink jet printer 10.

As shown in FIG. 4, at least one part of the fiber 91 of the permeable medium 90 is caused to develop color by the dye in the ink 11a.

The printed medium manufactured by the printed medium manufacturing method according to the present embodiment can be used in various applications such as, for example, T shirt, uniform, curtain, sheets, flags, labarum, drop curtain. For example, the printed medium manufactured by the printed medium manufacturing method according to the present embodiment can also be used for an interior material used for a long time such as a wall paper, Japanese sliding door paper.

As described above, the printed medium manufacturing method according to the present embodiment can suppress the usage amount of the ink 11a necessary for achieving a sufficient print density since not only is the permeable medium 90 dyed with the pigment in the ink 11a but the permeable medium 90 itself is caused to develop color with the dye in the ink 11a. Therefore, the printed medium manufacturing method according to the present embodiment can enhance the print density of the surface 90a of the permeable medium 90 while suppressing the smearing of the ink 11a at the surface 90a of the permeable medium 90. In other words, the printed medium manufacturing method according to the present embodiment can enhance the quality of printing compared to the conventional art.

Since the ink 11a contains not only the dye but also the pigment, which has a larger grain than the dye, the viscosity is high and the smearing is less likely to occur when applied on the permeable medium 90 compared to the conventional dye ink, that is, the ink containing only the dye out of the dye and the pigment. Therefore, the printed medium manufacturing method according to the present embodiment can be completed easily in a short time and at low cost compared to the printing on the permeable medium 90 by the conventional dye ink, similar to the printing on the permeable medium 90 by the conventional pigment ink, that is, the ink containing only the pigment out of the dye and the pigment.

Since the grain of the pigment is larger than that of the dye, the ink 11a has a higher viscosity the greater the ratio of the amount of pigment with respect to the amount of dye (also includes amount of binder resin if the binder resin also exists in the ink 11a in a form of grain). For example, in the ink 11a, the amount of dye may be 30%, and the amount of pigment may be 70%.

The printed medium manufacturing method according to the present embodiment causes the permeable medium 90 itself to develop color with the dye in the ink 11a, so that even if the pigment in the ink 11a gets caught at the fluff on the surface 90a of the permeable medium 90 when the medium in which a great number of tall fluffs are raised on the surface 90a is the permeable medium 90, the entire surface 90a of the permeable medium 90 can be dyed with the dye in the ink 11a. Therefore, the printed medium manufacturing method according to the present embodiment can enhance the quality of printing compared to the conventional art.

Figure 5A:
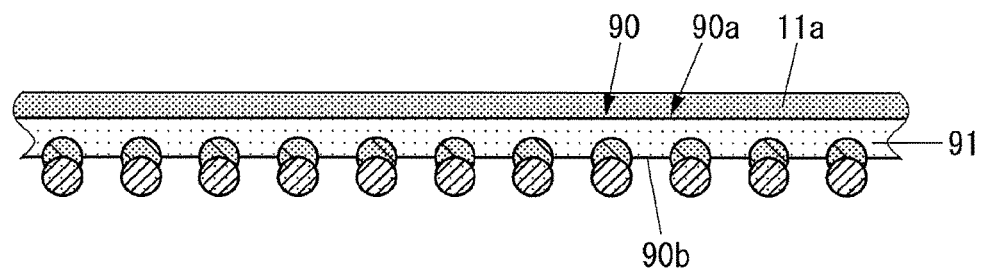
FIG. 5A is a side cross-sectional view of one part of the permeable medium serving as a printed medium in the printed medium manufacturing method according to one embodiment of the present disclosure.
Figure 5B:
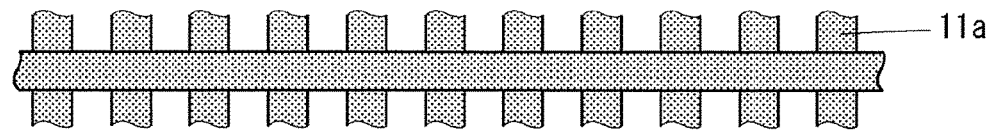
FIG. 5B is a top view of one part of the permeable medium shown in FIG. 5A.
Figure 5C:
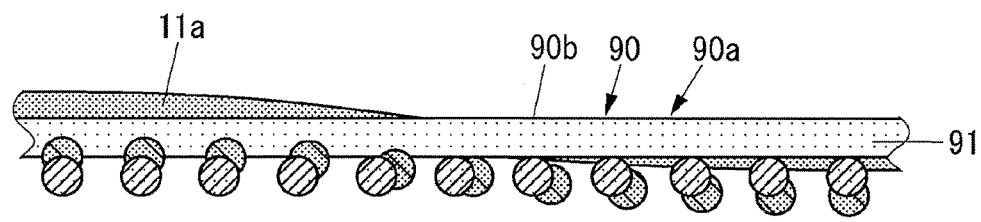
FIG. 5C is a side cross-sectional view of one part of the permeable medium shown in FIG. 5A when the fiber is rotated or moved.
Figure 5D:
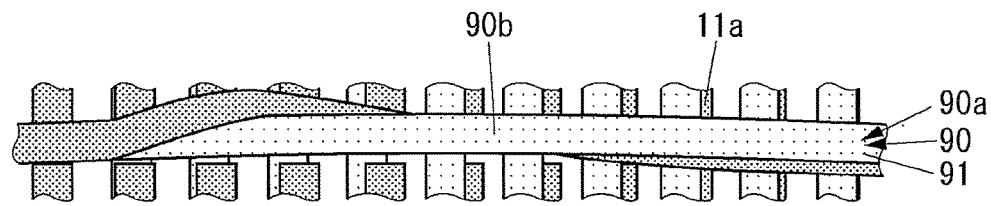
FIG. 5D is a top view of one part of the permeable medium shown in FIG. 5C.

FIG. 5A is a side cross-sectional view of one part of the permeable medium 90 serving as a printed medium in the printed medium manufacturing method according to the present embodiment. FIG. 5B is a top view of one part of the permeable medium 90 shown in FIG. 5A. FIG. 5C is a side cross-sectional view of one part of the permeable medium 90 shown in FIG. 5A when the fiber 91 is rotated or moved. FIG. 5D is a top view of one part of the permeable medium 90 shown in FIG. 5C.

In the printed medium manufacturing method according to the present embodiment, the ink 11a is discharged from the ink jet head 11 and attached to the surface 90a of the permeable medium 90, but the pigment in the ink 11a does not permeate into the fiber 91 configuring the permeable medium 90, as shown in FIGS. 5A and 5B. Thus, if a strong friction is applied on the permeable medium 90 performed with ink jet printing using the ink 11a, the fiber 91 of the permeable medium 90 may rotate or move, and a portion 90b not attached with the pigment in the permeable medium 90 may appear on the surface 90a of the permeable medium 90, as shown in FIGS. 5C and 5D. However, in the printed medium manufacturing method according to the present embodiment, the permeable medium 90 itself is caused to develop color with the dye in the ink 11a, and the portion 90b not attached with the pigment that appeared on the surface 90a of the permeable medium 90 is also caused to develop color with the dye, and hence the lowering of the print density of the surface 90a of the permeable medium 90 can be suppressed. Therefore, the printed medium manufacturing method according to the present embodiment can enhance the fastness such as the fastness to rubbing and fastness to laundering compared to the conventional art.

Figure 6A:
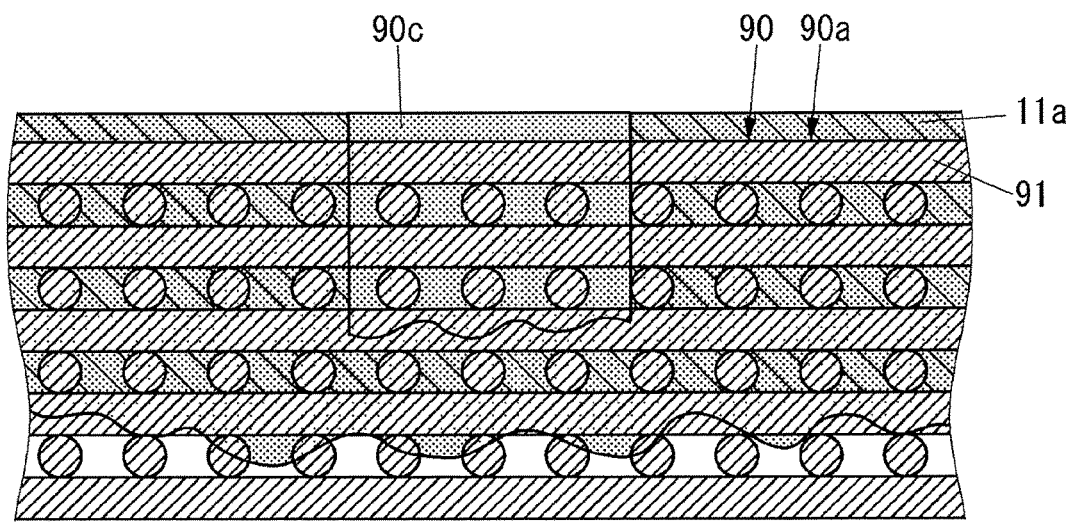
FIG. 6A is a side cross-sectional view of one part of the permeable medium shown in FIG. 4 when some pigment is peeled off.
Figure 6B:
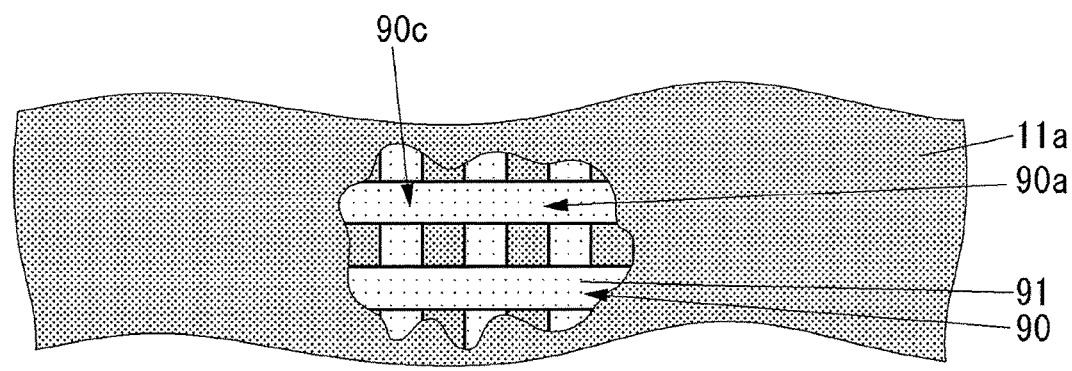
FIG. 6B is a top view of one part of the permeable medium shown in FIG. 6A.
Figure 7A:
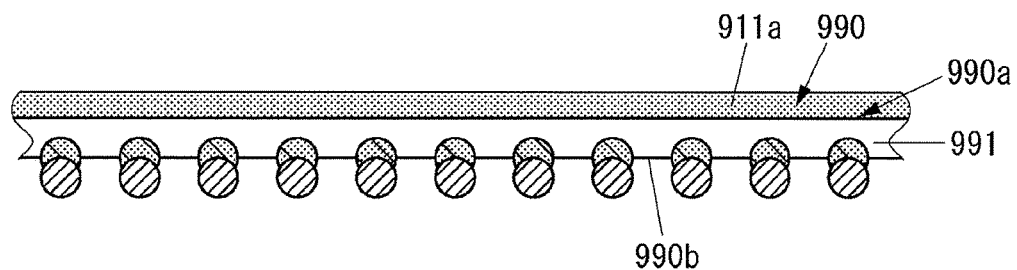
FIG. 7A is a side cross-sectional view of one part of the printed fabric manufactured through the conventional method using the pigment ink.
Figure 7B:
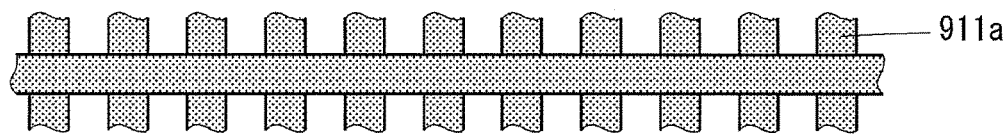
FIG. 7B is a top view of one part of the fabric shown in FIG. 7A.
Figure 7C:
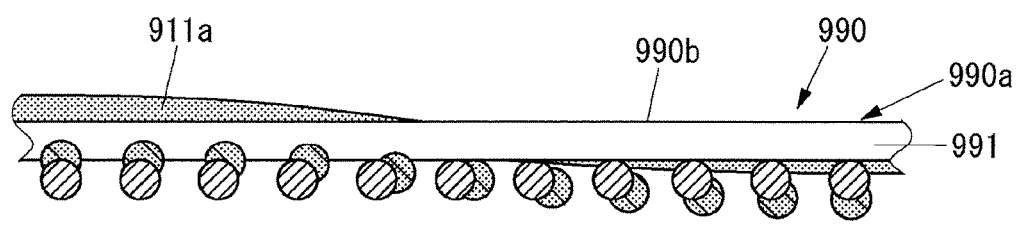
FIG. 7C is a side cross-sectional view of one part of the fabric shown in FIG. 7A when the fiber is rotated or moved.
Figure 7D:
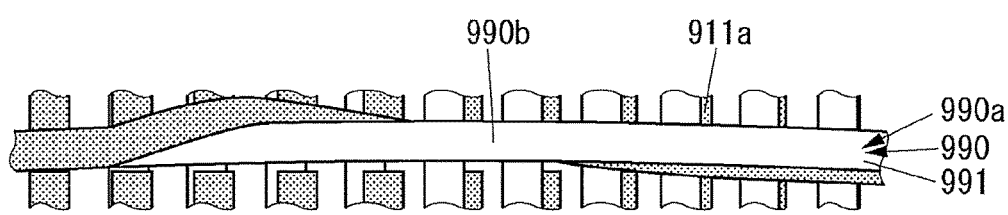
FIG. 7D is a top view of one part of the fabric shown in FIG. 7C.
Figure 8A:
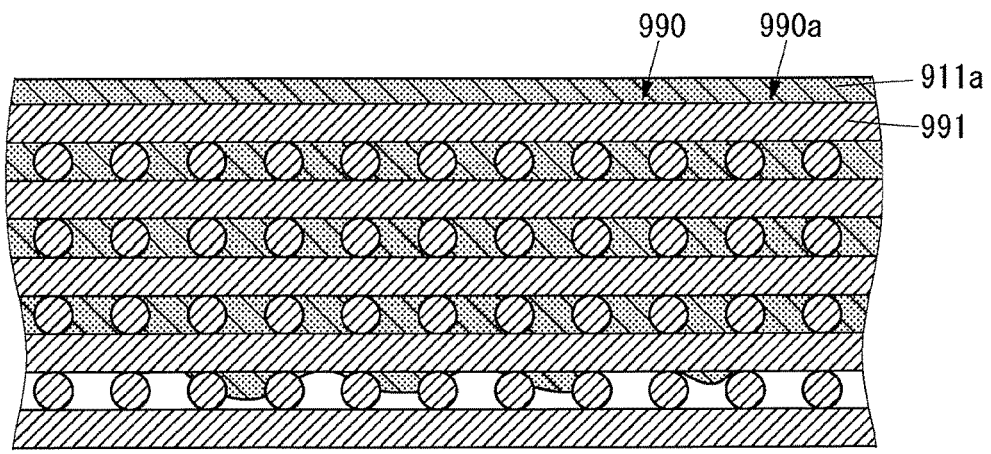
FIG. 8A is a side cross-sectional view of one part of the printed fabric different from the fabric shown in FIGS. 7A to 7D manufactured through the conventional method using the pigment ink.
Figure 8B:
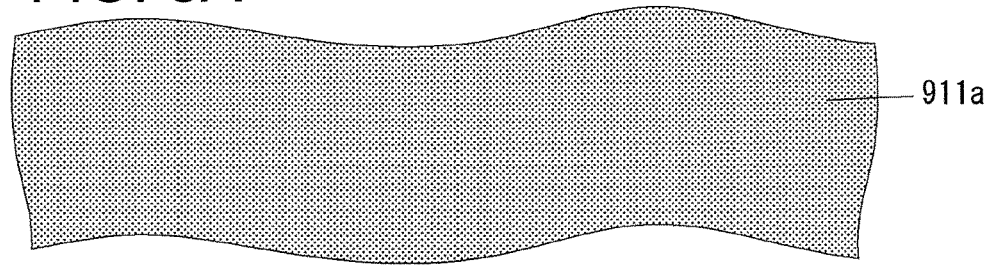
FIG. 8B is a top view of one part of the fabric shown in FIG. 8A.
Figure 8C:
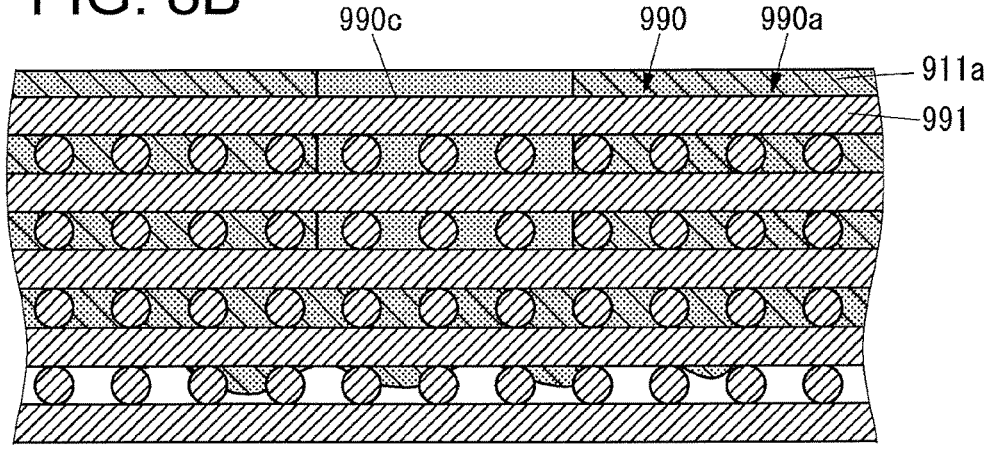
FIG. 8C is a side cross-sectional view of one part of the fabric shown in FIG. 8A when some pigment is peeled off.
Figure 8D:
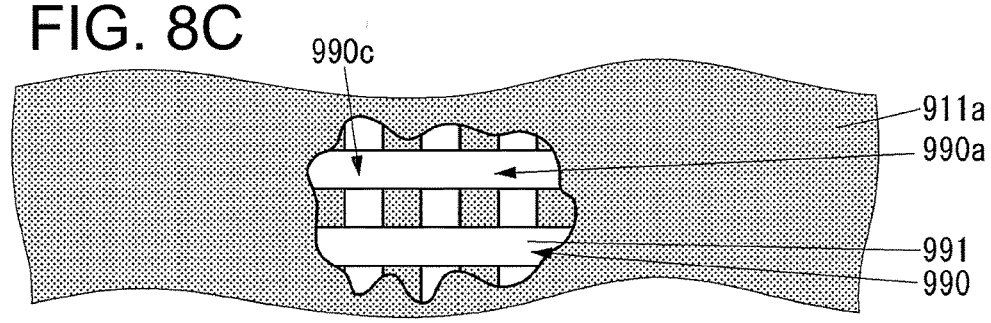
FIG. 8D is a top view of one part of the fabric shown in FIG. 8C.

FIG. 6A is a side cross-sectional view of one part of the permeable medium 90 shown in FIG. 4 when some pigment is peeled off. FIG. 6B is a top view of one part of the permeable medium 90 shown in FIG. 6A.

Since the pigment cannot dye the fiber 91 itself of the permeable medium 90, when the ink 11a is discharged from the ink jet head 11 and attached to the surface 90a of the permeable medium 90, the pigment is in a state of being adhered to the fiber 91 with the binder resin, as shown in FIG. 4, in the printed medium manufacturing method according to the present embodiment. Thus, if a strong friction is applied on the permeable medium 90 performed with ink jet printing using the ink 11a, the pigment falls off from one part of the fiber 91 of the permeable medium 90, and a portion 90c not attached with the pigment in the permeable medium 90 may appear on the surface 90a of the permeable medium 90, as shown in FIGS. 6A and 6B. However, in the printed medium manufacturing method according to the present embodiment, the permeable medium 90 itself is caused to develop color with the dye in the ink 11a, and the portion 90c not attached with the pigment that appeared on the surface 90a of the permeable medium 90 is also caused to develop color with the dye, and hence the lowering of the print density of the surface 90a of the permeable medium 90 can be suppressed. Therefore, the printed medium manufacturing method according to the present embodiment can enhance the fastness such as the fastness to rubbing and fastness to laundering compared to the conventional art.

In the printed medium manufacturing method according to the present embodiment, when the color of the pigment in the ink 11a and the color after the color development of the dye in the ink 11a are not similar to the color of the permeable medium 90 in a non-dyed state, as the permeable medium 90 itself is caused to develop color with the dye with a color not similar to the permeable medium 90 in a non-dyed state, even if the portion not attached with the pigment in the permeable medium 90 appears on the surface 90a of the permeable medium 90, such portion not attached with the pigment in the permeable medium 90 becomes difficult to be visually recognized. Therefore, the printed medium manufacturing method according to the present embodiment can enhance the fastness such as the fastness to rubbing and the fastness to laundering.

Furthermore, in the printed medium manufacturing method according to the present embodiment, when the color of the pigment in the ink 11a and the color after the color development of the dye in the ink 11a are similar colors to each other such as a combination in which the color of the pigment in the ink 11a and the color after the color development of the dye in the ink 11a are respectively blue and cyan, a combination in which the respective colors are magenta and light red, and the like, the permeable medium 90 itself is caused to develop color with the color similar to the pigment in the ink 11a by the dye in the ink 11a, and thus even if the portion not attached with the pigment in the permeable medium 90 appears on the surface 90a of the permeable medium 90, such portion not attached with the pigment in the permeable medium 90 becomes difficult to be visually recognized. Therefore, the printed medium manufacturing method according to the present embodiment can enhance the fastness such as the fastness to rubbing and the fastness to laundering.

In the printed medium manufacturing method according to the present embodiment, even if the color of the pigment in the ink 11a and the color after the color development of the dye in the ink 11a are not similar colors to each other, if the color of the pigment in the ink 11a and the color after the color development of the dye in the ink 11a are not similar to the color of the permeable medium 90 in a non-dyed state, an effect that the portion not attached with the pigment in the permeable medium 90 becomes difficult to be visually recognized can be expected, as described above.

The color of the color material in the ink 11a may be a color other than yellow, magenta, cyan, and black. For example, the color of the color material in the ink 11a may be a special color such as red, green, blue, orange, yellowish green, fluorescence colors, and the like or may be metallic, pearl, and the like. If the color of the pigment in the ink 11a is metallic or pearl, a light color in which the hue is close to the color of the pigment may be selected for the color after the color development of the dye in the ink 11a, or when the color of the permeable medium 90 is white, a color different from the color of the permeable medium 90 such as, for example, gray, and the like, may be selected.

As described above, the printed medium manufacturing method according to the present embodiment can enhance the fastness such as the fastness to rubbing and the fastness to laundering. For example, the fastness to rubbing at the time of moistness was grade two to three in the conventional method for manufacturing the printed fabric through the ink jet printing using the pigment ink, but was improved to grade five by the printed medium manufacturing method according to the present embodiment.

The dye has low light resistance and weather resistance. However, in the printed medium manufactured through the printed medium manufacturing method according to the present embodiment, the dye is protected by the pigment as the pigment of high light resistance and weather resistance exists on the outer side. In other words, in the printed medium manufactured through the printed medium manufacturing method according to the present embodiment, the pigment plays a role of maintaining the fastness related to light resistance and weather resistance. Therefore, the printed medium manufactured through the printed medium manufacturing method according to the present embodiment can maintain the fastness same as that of the printed medium manufactured through the conventional method using the pigment ink with respect to the light resistance and the weather resistance.

The printed medium manufacturing method according to the present embodiment increases the viscosity of the ink 11a by the viscosity increasing process before the pigment fixing process and the dye color developing process to suppress the smearing of the ink 11a at the surface 90a of the permeable medium 90, and hence can enhance the quality of printing. The printed medium manufacturing method according to the present embodiment may execute the pigment fixing process in the ink jet printing step by having the binder resin in the ink 11a as the binder resin for fixing the pigment to the permeable medium 90 at a heating temperature by the print heater 15.

In the printed medium manufacturing method according to the present embodiment, the binder resin in the ink 11a is the latex system resin, and the fine particles of the binder resin are dispersed in the solvent of the ink 11a, and thus the amount of increase in the viscosity of the ink 11a with respect to the amount of evaporation of the solvent of the ink 11a becomes large, and the viscosity of the ink 11a can be increased at high speed. Therefore, the printed medium manufacturing method according to the present embodiment can enhance the quality of printing while suppressing the smearing of the ink 11a at the surface 90a of the permeable medium 90.

In the printed medium manufacturing method according to the present embodiment, the auxiliary agent is not necessary in the ink 11a if the dye in the ink 11a is the disperse dye, and thus the process for the auxiliary agent is not necessary. Therefore, the printed medium manufacturing method according to the present embodiment can easily manufacture the printed medium. For example, in the printed medium manufacturing method according to the present embodiment, a combination of the disperse dye and the permeable medium 90 made of polyester can be adopted as one preferable combination of the dye in the ink 11a and the permeable medium 90.

The printed medium manufacturing method according to the present embodiment can suppress the usage amount of the ink 11a necessary for achieving a sufficient print density even with the ink 11a having a viscosity the ink jet printing can be carried out, that is, the ink 11a of low viscosity since not only is the permeable medium 90 dyed with the pigment in the ink 11a but the permeable medium 90 itself is caused to develop color with the dye in the ink 11a. Therefore, the printed medium manufacturing method according to the present embodiment can enhance the print density of the surface 90a of the permeable medium 90 while suppressing the smearing of the ink 11a at the surface 90a of the permeable medium 90. In other words, the printed medium manufacturing method according to the present embodiment can enhance the quality of printing.

The evaporation of the solvent in the ink 11a is realized by the print heater 15 in the present embodiment. However, this may be realized through other methods. For example, the solvent of the ink 11a may have one part evaporated with the print heater 15 and the other part evaporated by at least one of the after-heater 17 or the infrared after-heater 18.

The fixation of the pigment in the ink 11a to the permeable medium 90 and the color development of the permeable medium 90 itself by the dye in the ink 11a are realized by the after-heater 17 and the infrared after-heater 18 in the present embodiment. However, this may be realized through other methods. For example, it may be realized by only either one of the after-heater 17 or the infrared after-heater 18. The after-heater 17 may be a roll heater that pressure contacts and heats the permeable medium 90.

The printed medium manufacturing method according to the present embodiment executes the ink jet printing step and the fixing and color developing step by the ink jet printer 10, and thus can be easily executed if the pre-process and the post-process that cannot be executed by the ink jet printer 10 are not necessary.

The printed medium manufacturing method according to the present embodiment may execute at least some processes without using the ink jet printer 10. For example, the printed medium manufacturing method according to the present embodiment may execute at least one of the viscosity increasing process, the pigment fixing process, and the dye color developing process without using the ink jet printer 10.

The printed medium manufacturing method according to the present embodiment uses the ink jet printer 10, which is a so-called Role to Role feeding serial ink jet printer that moves the ink jet head 11 in the main scanning direction to move the permeable medium 90 in the sub-scanning direction in the description made above, but may use other types of ink jet printer. For example, the printed medium manufacturing method according to the present embodiment may use a so-called flat bed type ink jet printer that moves the ink jet head 11 with respect to the permeable medium 90 without moving the permeable medium 90, or may use a so-called line head ink jet printer.

Furthermore, the printed medium manufacturing method according to the present embodiment may attach the ink 11*a* to the permeable medium 90 through methods other than the ink jet printing in the ink attaching process. For example, the printed medium manufacturing method according to the present embodiment may attach the ink 11*a* to the permeable medium 90 with a dispenser, attach the ink 11*a* to the permeable medium 90 through digital screen printing, or attach the ink 11*a* to the permeable medium 90 through digital pad printing.

What is claimed is:

1. A printed medium manufacturing method for manufacturing a printed medium by performing printing with ink with respect to a permeable medium, which is a recording medium that permeates ink, wherein
    the ink includes
    a pigment for dying the permeable medium;
    a binder resin that fixes the pigment to the permeable medium by being heated, wherein the binder resin is a latex system resin, fine particles of the binder resin are dispersed in the solvent of the ink;
    a dye that causes the permeable medium itself to develop color by being heated; and
    a solvent that causes the dye to dissolve or disperse, and
    the printed medium manufacturing method includes
    an ink attaching process of attaching the ink to the permeable medium, wherein in the ink attaching process, the binder resin and the pigment are attached to a surface of the permeable medium and the dye is permeated into the permeable medium together with the solvent;
    a viscosity increasing process of evaporating the solvent to increase a viscosity of the ink by a first heating member that performs a first heating to the permeable medium before the ink attaching process or the ink attached to the permeable medium during the ink attaching process;
    a pigment fixing process of fixing the pigment to the permeable medium with the binder resin by a second heating member that performs a second heating to the ink attached to the permeable medium, wherein the pigment is adhered to the permeable medium with the binder resin by the second heating member that performs the second heating;
    a dye color developing process of causing the permeable medium itself to develop color with the dye by the second heating member that performs the second heating to the ink attached to the permeable medium;
    wherein the second heating is performed after the first heating.

2. The printed medium manufacturing method according to claim 1, wherein
    a heating temperature of the ink is high in the dye color developing process compared to the viscosity increasing process.

3. The printed medium manufacturing method according to claim 1, wherein the dye is a disperse dye.

4. The printed medium manufacturing method according to claim 1, wherein a color of the pigment and a color after color development of the dye are not colors similar to a color of the permeable medium in a non-dyed state.

5. The printed medium manufacturing method according to claim 1, wherein a color of the pigment and a color after color development of the dye are similar colors to each other.

6. The printed medium manufacturing method according to claim 1, wherein
    the ink attaching process is a process of attaching the ink to the permeable medium by an ink jet printing, and
    a viscosity of the ink is a viscosity at which the ink jet printing is carried out.

7. A printed medium manufacturing device for manufacturing a printed medium by performing printing with ink with respect to a permeable medium, which is a recording medium that permeates ink, wherein
    the ink includes
    a pigment for dying the permeable medium;
    a binder resin that fixes the pigment to the permeable medium by being heated, wherein the binder resin is a latex system resin, fine particles of the binder resin are dispersed in the solvent of the ink;
    a dye that causes the permeable medium itself to develop color by being heated; and
    a solvent that causes the dye to dissolve or disperse, and
    the printed medium manufacturing device includes
    an ink attaching device for attaching the ink to the permeable medium, wherein by the ink attaching device, the binder resin and the pigment are attached to a surface of the permeable medium and the dye is permeated into the permeable medium together with the solvent;
    a viscosity increasing device for evaporating the solvent to increase a viscosity of the ink by a first heating member that performs a first heating to the permeable medium or the ink attached to the permeable medium;
    a pigment fixing device for fixing the pigment to the permeable medium with the binder resin by a second heating member that performs a second heating to the ink attached to the permeable medium;
    a dye color developing device for causing the permeable medium itself to develop color with the dye by the second heating member that performs the second heating to the ink attached to the permeable medium; and
    a controller that controls the ink attaching device, the pigment fixing device and the dye color developing device,
    wherein the controller controls the pigment fixing device in which the pigment is adhered to the permeable medium with the binder resin by the second heating member that performs the second heating, and the controller controls that the second heating is performed after the first heating.

* * * * *